Aug. 22, 1939.  C. H. DALZELL  2,170,710
SEED SACKER
Filed May 26, 1938
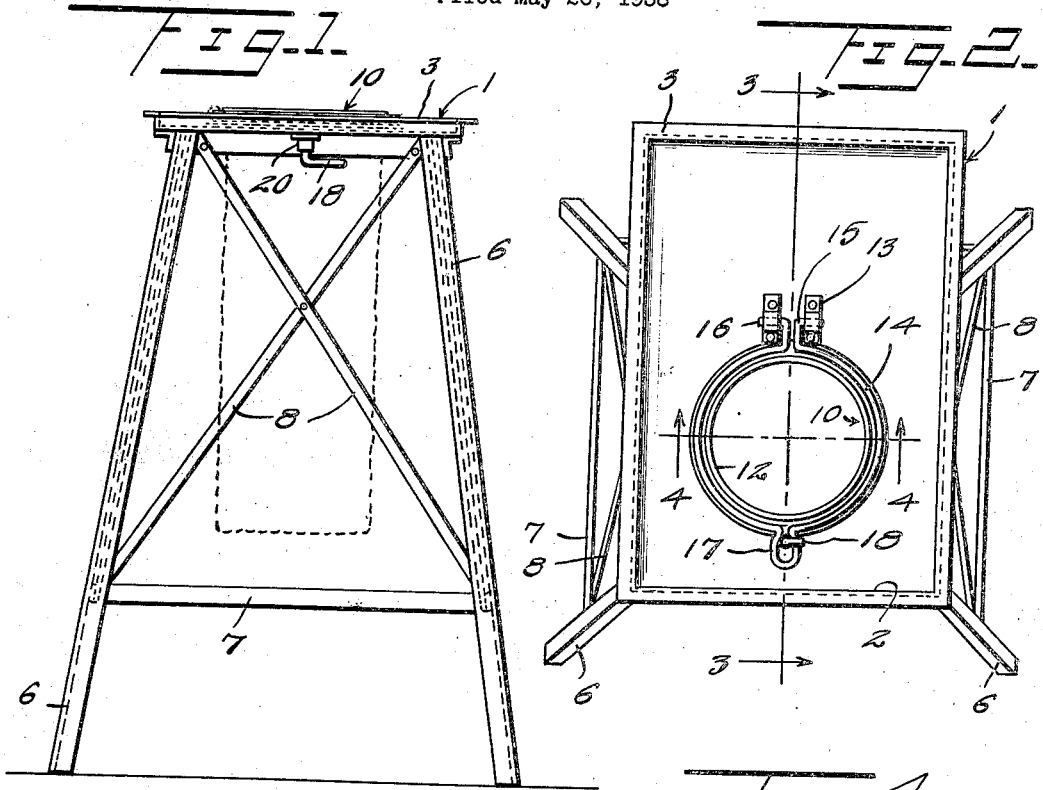
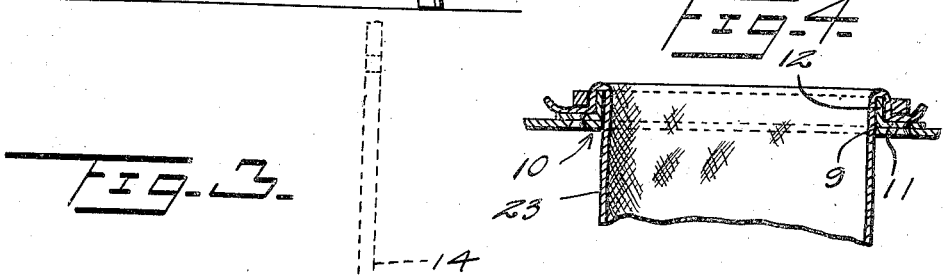
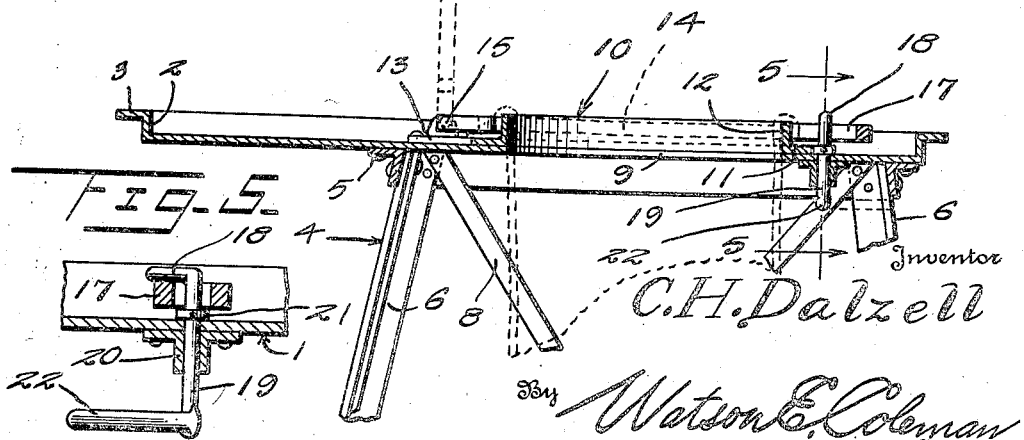
Inventor
C. H. Dalzell
By Watson E. Coleman
Attorney Patented Aug. 22, 1939

2,170,710

UNITED STATES PATENT OFFICE 2,170,710

SEED SACKER

Clifton H. Dalzell, Paris, Ky.

Application May 26, 1938, Serial No. 210,276

2 Claims. (Cl. 248—101)

This invention relates to improvements in devices for facilitating the bagging of seeds or similar material.

The present invention has for its primary object to provide an improved device for bagging or sacking seed, particularly grass seed, in which an improved bag holding means is provided whereby an attendant for the device may conveniently pack down the seeds by tramping the same without risk of injuring himself upon the bag holder.

Another object of the invention is to provide an improved seed sacking device having associated with a bag or sack securing means, a platform upon which an attendant of the device may stand and which will also operate as a means for catching any seed which is not directed into the bag so that loss of seeds will be avoided.

A still further object of the invention is to provide in a device of the above described character, an improved and novel bag mouth clamp which may be easily and quickly put into use or released and which will firmly grip the bag while in use so that it cannot become loose while the bag is being filled.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in front elevation of the seed sacker embodying the present invention.

Figure 2 is a view in top plan of the same.

Figure 3 is a vertical sectional view taken on the line 3—3 of Figure 2.

Figure 4 is a sectional view taken on the line 4—4 of Figure 2.

Figure 5 is a sectional view taken on the line 5—5 of Figure 3.

Referring now more particularly to the drawing, the numeral 1 generally designates a platform which is made of sufficient size to enable an attendant of the machine to stand thereon while the bag, which is attached to the platform, as shown, is being filled. As an illustration of one size in which this platform may be made, the width of the same may be approximately thirty-six inches with a depth or length of approximately forty-two inches. This platform is made of a suitable heavy metal such, for example, as sixteen gauge sheet steel, and it is shaped to provide the upstanding surrounding wall 2 terminating in the outwardly directed lip or flange 3 and thus serve, in addition to a support for an attendant, as a means for catching seed which may not be thrown directly into the sack which is suspended therefrom.

The platform 1 is secured to a suitable stand structure 4 which comprises a top frame 5 engaging the underside of the platform and the supporting legs 6 which are connected with the frame and extend downwardly from the underside of the platform in outwardly diverging relation, the legs being connected and braced at the sides and back of the structure by the transverse bars 7 and the obliquely disposed crossed bars 8.

Upon the longitudinal center of the platform and adjacent the front part thereof, there is formed the bag receiving opening 9 and secured to the top surface of the platform, flush with the edge of the opening and concentric therewith, is an annulus 10 which is formed of angle material, having one angular portion 11 lying flat upon the platform and secured thereto in any suitable manner, as by riveting or the like and having the other angular portion 12 extending upwardly with the inner surface flush with the edge of the opening, as shown in Figure 4.

At the rear or backside of the annulus 10, which may be referred to as the sack ring, there are located a pair of hinge ears 13 having their center alined and extending transversely of the platform, these ears being spaced apart on opposite sides of the longitudinal center of the platform.

Formed to encircle the sack ring or annulus 10 is a lock ring 14, which is preferably formed of square bar material, and is open or split as shown in Figure 2, each of the ends of the lock ring or split annulus being extended to form the radially directed parallel bars 15 each terminating in the laterally directed trunnion 16, the trunnions being directed oppositely to one another, and each extending through a hinge ear 13, as shown in Figure 2. The lower ring is thus pivotally secured to the platform and may be lowered into a plane parallel with the platform and concentric with the sack ring 10 as shown.

The lock ring is formed diametrically opposite from the division thereof into a slightly elongated locking loop 17. This loop may be closed at its ends, as shown, or it may be open at its inner end, if desired, and it is adapted when in down position with the locking ring 14 to have projected therethrough the locking finger 18 which is carried upon and forms a right angular extension of the upper end of a vertically disposed lock shaft 19. This shaft 19 passes upwardly through the platform and through a suitable guide sleeve 20 secured to the underside of the platform and is maintained against downward longitudinal movement in any suitable manner as by the provision of a collar 21 secured thereabout and engaging the top surface of the platform, as shown in Figure 5. At its lower end, the lock shaft 19 carries a handle 22 by which the oscillation of the shaft and the locking finger 18 may be conveniently effected.

The front of the stand 4 for the platform is opened to permit the positioning of a bag beneath the platform and in the use of the device, such a bag may be placed in the position shown in Figure 4 with the top edge thereof turned down over the edge of the bag ring or annulus 10, the lock ring 14, of course, being raised to the position shown in dotted lines in Figure 2. After the top edge of the bag, which is indicated by the numeral 23, has been fitted down over the edge of the annulus 10, the lock ring 14 is swung down so as to be brought into encircling relation with the ring 10 and thus clamp the edge of the bag between the two rings in the manner shown. The lock finger 18 will be turned to a position where the loop 17 may pass thereover when the lock ring is lowered and after the latter ring has been forced down into clamping relation with the ring or annulus 10, the shaft 19 is oscillated by the handle 22 to swing the finger over and into engagement with the top edge of the loop 17, as shown in Figures 2 and 5, to thus firmly secure the lock ring in place.

As the seed is shoveled into the bag or sack 23, an attendant, standing upon the platform 1, packs the seed down by stepping into the bag through the opening 9 and treading the seed. The platform serves as a convenient means of catching any seed which does not get into the bag, in addition to providing a place for the attendant to stand. After the sack or bag has been filled, the lower ring is released and the bag allowed to drop down so that it may be taken out between the front legs of the stand 4.

I claim:

1. A seed sacker of the character described, comprising a platform, a supporting structure for the platform, said platform having an opening therethrough for the reception of the mouth of a sack, an upstanding annular ring secured to the platform around and concentric with the opening over which ring the mouth of a sack may be folded, a clamp ring adapted to encircle the first ring, means for pivotally securing the clamp ring to the platform whereby the ring may be swung into or out of operative relation with the first ring, said clamp ring having an elongated loop formed integral therewith opposite said pivotal means and adapted to be brought into close proximity to the platform when the clamp ring is in bag holding relation with said flange, an oscillatable shaft extending upwardly through the platform in position to extend through said loop, and a lock finger carried by said oscillatable shaft for engagement over and in contact with the top edge of said loop to maintain the lock ring against movement.

2. A seed sacker comprising a platform, supporting means for the same, said platform having an opening through which the mouth of a seed sack may be extended, a collar encircling said opening and having an upstanding flange over which said sack mouth may be folded, a split ring of a diameter to encircle said collar and having two end portions, a pair of oppositely directed trunnions connected with said end portions, means for pivotally connecting said trunnions with said platform, a locking loop formed from said lock ring opposite from said trunnions, a shaft extending upwardly through said platform in a position to extend through said loop when the lock ring is in sack mouth securing relation with said flange, means facilitating the oscillation of the shaft, and a lock finger carried by said shaft above and in spaced relation with the platform and adapted to engage over the edge of said loop to secure the lock ring in position.

CLIFTON H. DALZELL.